United States Patent [19]
Henkins et al.

[11] Patent Number: 6,033,600
[45] Date of Patent: Mar. 7, 2000

[54] REDUCED DUST STABILIZER BLENDS COMPACT AND A METHOD FOR MAKING THEREOF

[75] Inventors: E. Scott Henkins, Pentress; John C. Wittenauer, Morgantown, both of W. Va.

[73] Assignee: General Electric Company, Pittsfield, Mass.

[21] Appl. No.: 08/319,702

[22] Filed: Oct. 7, 1994

[51] Int. Cl.[7] .................................................. C09K 15/32
[52] U.S. Cl. .............................. 252/400.24; 252/400.61; 252/403; 524/120
[58] Field of Search .................................. 524/101, 120, 524/399, 436, 401.61, 403; 523/204, 220; 252/400.24, 400.61

[56] References Cited

U.S. PATENT DOCUMENTS

| | | |
|---|---|---|
| 3,745,145 | 7/1973 | Khattab et al. . |
| 3,886,114 | 5/1975 | Beadle . |
| 3,928,505 | 12/1975 | Klicker .................................... 524/120 |
| 4,025,486 | 5/1977 | Gilles . |
| 4,064,100 | 12/1977 | Hechenbleikner ...................... 524/120 |
| 4,185,004 | 1/1980 | Mathis . |
| 4,341,880 | 7/1982 | Toyoda et al. ........................... 524/120 |
| 4,368,139 | 1/1983 | Pollock et al. ...................... 252/400.61 |
| 4,444,929 | 4/1984 | Chaser . |
| 4,670,493 | 6/1987 | Ashbroeck et al. ..................... 524/120 |
| 4,675,356 | 6/1987 | Miyata .................................... 524/436 |
| 4,857,230 | 8/1989 | Matsumura . |
| 4,957,956 | 9/1990 | Neri et al. ............................... 524/120 |
| 4,965,301 | 10/1990 | Leininger . |
| 4,983,657 | 1/1991 | Humplik et al. . |
| 4,985,481 | 1/1991 | Neri et al. ............................... 524/120 |
| 5,015,679 | 5/1991 | Matmura . |
| 5,028,486 | 7/1991 | Dunski ................................ 252/400.61 |

*Primary Examiner*—Veronica P. Hoke

[57] ABSTRACT

A stabilizer blend composition, a method for providing compacted particles, and compacted particles are provided. The compacted particles exhibit reduced levels of dust, and are durable during handling. The composition contains a pentaerythritol phosphite, a hindered phenolic isocyanurate, a metal salt of a fatty acid and hydrotalcite. The method involves blending the above ingredients and compacting them under pressure to form compacted particles, such as pellets. The compacted particles are useful as additives to polymeric compositions for stabilization thereof.

11 Claims, 1 Drawing Sheet

REDUCED DUST STABILIZER BLENDS COMPACT AND A METHOD FOR MAKING THEREOF

BACKGROUND OF THE INVENTION

1. Field of the Invention

The present invention relates to blends of a phosphite, a hindered phenolic isocyanurate, and neutralizers, compacts made therefrom and methods for making the compacts, more particularly relates to blends of pentaerythritol diphosphite, hindered phenolic isocyanurate, and neutralizers, and compacted particles made therefrom, and methods for making said compacted particles.

2. Description of the Related Art

It generally known to stabilized polymeric compositions by adding thereto phosphates, hindered phenolics and neutralizers. Typically such addition is made by separately adding the phosphite, hindered phenol and neutralizer into the polymeric composition to yield the stabilized polymeric composition which may then be further processed, such as by molding, into the final desired article. Various blends of phosphates, hindered phenols and neutralizers have been previously made as a single additive package, which then can be preformulated and added into the polymeric composition as a single additive blend.

Certain blends of phosphites, hindered phenolics and neutralizers, when formed into soft particles, can produce particles which have associated therewith substantial amounts of dust, which is undesirable in that the dust can become air born, and is difficult to handle in a neat, clean and controlled fashion.

Accordingly, there is a desire to produce phosphite, hindered phenol, neutralizer blend compositions which exhibit reduced dust characteristics, and preferably are essentially dust free.

SUMMARY OF THE INVENTION

The present invention provides additive blend compositions, compacted particles, and methods for producing said compacted particles, which yield compacted particles which upon handling and processing, do not form substantial amounts of dust, and which are essentially dust free. The blend compositions contain respective amounts of a pentaerythritol phosphite, a hindered phenolic isocyanurate, and a combination of neutralizers including a metal salt of a fatty acid, and a hydrotalcite. The metal salt of a fatty acid is preferably present in the blend at a level of from 10 to 60 percent by weight, and the hydrotalcite is preferably present in the blend at a level of from 1 to 10 percent by weight. The blend may be compacted by stepwise method into a solid compact particle, which retains its shape, and exhibits a durability which results in a minimum amount of dust formation during processing, and essentially no dust formation during processing or handling thereof.

DETAILED DESCRIPTION OF THE INVENTION

Figure 3:
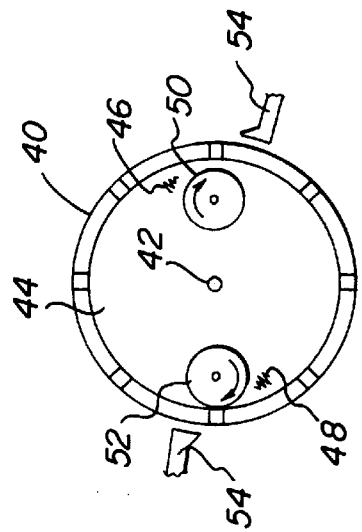
FIG. 3 is a top elevational view of the pelletizer.

The pentaerythritol phosphite compound is preferably selected from the group consisting of (a) compounds of the formula

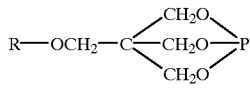

wherein R is an aliphatic radical containing 1 to about 20 carbon atoms, a cycloalkyl ring of 5 to about 8 carbon atoms, or an aryl, alkaryl, or aralkyl group of 6 to about 14 carbon atoms, and (b) compounds of the formula

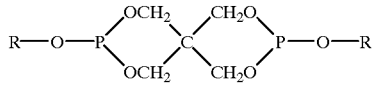

wherein R is defined as above. Illustrative of these compounds are those where when R is an aliphatic radical; R can be (a) an alkyl radical such as methyl, ethyl, isopropyl, n-butyl, n-boxyl, 2-ethylhexyl, n-dodecyl, n-tetradecyl, n-octadecyl, and the like, (b) an alkoxyalkyl radical of 2 to about 20 carbon atoms such as methoxyethyl, ethoxyethyl, ethoxypropyl, and the like, and (c) alkoxy carboalkyl radicals of 2 to about 20 carbon atoms such as methoxycarboethyl, propyloxycarboethyl, decyloxycarboethyl, and the like. When R is a cycloalkyL ring, illustrations of R include cyclopentyl, cyclohexyl, cyclooctyl, and the like. When R is an aryl group, phenyl and naphthyl are examples thereof. The aryl group can be halogenated as in a bromophenyl group. Lastly, when R is alkaryl of 7 to about 14 carbon atoms; i.e., an alkyl-substituted phenyl or naphthyl group, illustrations thereof are methylphenyl, t-butyl-phenyl, nonylphenyl, and the like; and when R is aralkyl of 7 to about 14 carbon atoms; i.e., an aryl-substituted alkyl group, benzyl and phenylethyl are examples thereof. The alkaryl or aralkyl group can be halogenated as in a 2-chloroethylphenyl group.

Examples of the defined pentaerythritol phosphites are dimethylpentaerythritol diphosphite, diethylpentaerythritol diphosphite, didodecylpentaerythritol diphosphite, dioctade, zylpentaerythritol diphosphate, diphenylpentaerythritol diphosphite, ditolylpentaerythritol diphosphite, di-p-chlorophenylpentaerythritol diphosphate, dibenzylpentaerythritol diphosphite, and the like. U.S. Pat. Nos. 2,847,443; 2,961,454; 3,000,850; 3,205,250; 3,737,485; and U.S. Pat. No. 4,305,866 disclose further examples of the defined compounds and are included herein by reference.

More preferably, the R groups are alkyl radicals of 1 to 20 carbon atoms, cyclohexyl, phenyl, or benzyl. Most preferably, R is a higher-alkyl group containing about 6 to about 20 carbon atoms such as n-hexyl, n-octyl, 2-ethylhexyl, n-decyl, n-tetradecyl, n-octadecyl, and the like.

The hindered phenolic isocyanurate is preferable a hydroxy phenol alkyleneyl isocyanurate compound. The hydroxyphenylalkyleneyl isocyanurate compounds have the formula

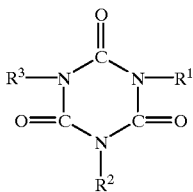

wherein $R^1$ is a hydroxyphenylalkyleneyl radical of the formula

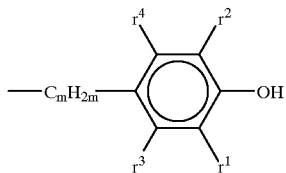

where m is 1 to 4, $r^1$ is an alkyl radical having 1 to 18 carbon atoms and is positioned immediately adjacent to the hydroxy group on the ring, $r^2$, $r^3$ and $r^4$ are hydrogen or an alkyl radical containing 1 to 18 carbon atoms, and $R^2$ and $R^3$ are hydrogen, an alkyl radical containing 1 to 18 carbon atoms, or are the same as $R^1$. A more preferred compound is when $R^2$ and $R^3$ are equal to $R^1$, i.e., all the $R^1$, $R^2$ and $R^3$ groups are hydroxyphenylalkyleneyl radicals, and $r^1$ is a t-alkyl radical containing from 4 to about 12 carbon atoms, $r^2$ is an alkyl radical containing 1 to about 12 carbon atoms, $r^3$ and $r^4$ are hydrogen, and m=1.

Even more preferred are the symmetrical tris (3, 5-di-tert-alkyl-4-hydroxybenzyl) isocyanurates of the formula

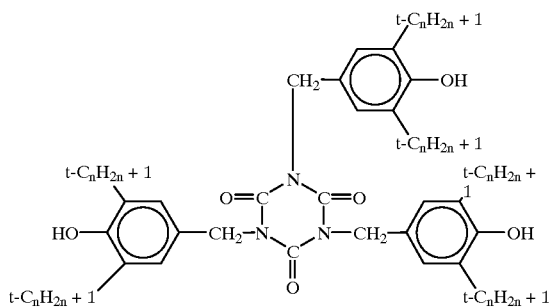

where n is 4 to 8.

Examples of the 4-hydroxybenzyl isocyanurate compounds are: tris-(3-methyl-4-hydroxybenzyl) isocyanurate, tris-(3-t-butyl-4-hydroxybenzyl) isocyanurate, tris-(3-t-amyl-4-hydroxybenzyl) isocyanurate, tris-(3-cetyl-4-hydroxybenzyl)-isocyanurate, tris-(3,5-dimethyl-4-hydroxybenzyl) isocyanurate, tris-(3,5-diisopropyl-4-hydroxybenzyl) isocyanurate, tris-(3-methyl-5-isopropyl-4-hydroxybenzyl) isocyanurate, tris-(3-hexyl-4-hydroxybenzyl) isocyanurate, tris-(3,5-di-t-butyl-4-hydroxybenzyl) isocyanurate, tris-(3-t-butyl-5-t-amyl-4-hydroxy-benzyl) isocyanurate, tris-(3,5-di-t-amyl-4-hydroxybenzyl)-isocyanurate, tris-(3,5-di(1-methyl-1-elhylpropyl)-4-hydroxy-benzyl) isocyanurate,tris-(3,5-di-(1,1,2,2-tetramethylpropyl)-4-hydroxybenzyl) isocyanurate, tris-(3,5-di-(1-dimethylpentyl)-4-hydroxybenzyl)-isocyanurate, bis-(3-methyl-4-hydroxybenzyl)-isocyanurate, bis-(3-t-butyl-4-hydroxybenzyl) isocyanurate, bis-(3,5-dimethyl-4-hydroxybenzyl) isocyanurate, bis-(3,-5-di-t-butyl-4-hydroxybenzyl) isocyanurate,(3-methyl-4-hydroxy-benzyl) isocyanurate (3-t-butyl-4-hydroxybenzyl) isocyanurate, (3,5-dimethyl-4-hydroxybenzyl) isocyanurate, (3,5-di-t-butyl-4-hydroxybenzyl) isocyanurate, and the like. Reference is made to U.S. Pat. No. 3,531,483 which discloses isocyanurate compounds encompassed by this invention. The patent shows the preparation of these compounds and their utility as stabilizers, and is hereby incorporated by reference. The metal salt of a fatty acid includes calcium, zinc, magnesium or barium salts of a fatty acid, including such fatty acids such as stearic acid, palmitic acid or lauric acid. Preferably the metal salt of the fatty acid is calcium stearate. The hydrotalcite, is preferably a monohydrotalcite or a dihydrotalcite, and such hydrotalcite is a magnesium-aluminum hydrotalcite, and may be represented by the following formula:

$$Mg_{1-x} \cdot Al_x(OH)_2 \cdot A_{x/2} \cdot MH_2O$$

wherein x stands for a value grater than 0 but equal to or smaller than 0.5 ($0 < x \leq 0.5$), A represents $CO_3^{2-}$ or $SO_4^{2-}$, and M stands for a positive value.

In general, the hydrotalcite is preferable a magnesium-aluminum composite hydroxide carbonate salt, and is more preferably represented by the general formula:

$$Mg_6 \cdot Al_2(OH)_{16} \cdot CO_3 \cdot 8H_2O$$

wherein g is 0 or has a positive value. Hydrotalcite may also be represented by the following formula:

$$M_x \cdot Al_y \cdot (OH)_{2x+3y-2z} \cdot (A)_z 2H_2O$$

wherein M represents Mg, Ca or Zn, A denotes $CO_3$ or $HPO_4$, x, y, and z stand for positive values.

The present blends preferably comprise the pentaerythritol phosphite at a level of from 10 to 90 percent by weight based on the total weight of the stabilizer blend composition, more preferably from 30 to 60 percent by weight thereof, most preferably between 39 and 49 percent by weight thereof; preferably the hindered phenolic isocyanurate is present at a level of between 10 to 90 percent by weight based on the total weight of the stabilizer blend composition, more preferably present at a level of from 20 to 50 percent by weight thereof, and most preferably present at a level of from 32 to 39 percent by weight thereof; preferably the metal salt of a fatty acid is present at a level of from 2 to 60 percent by weight based on the total weight of the stabilizer blend composition, preferably from 2 to 16 percent by weight, more preferably present at a level of from 5 to 16 percent by weight based on the total weight of the stabilizer blend composition, and most preferably present at a level of from 10 to 16 percent by weight based on the total weight of the stabilizer blend composition; preferably the hydrotalcite is present at a level of from 1 to 10 percent by weight based on the total weight of the stabilizer blend composition, and more preferably from 2 to 9 percent by weight thereof, and most preferably from 3 to 8 percent by weight thereof. The present stabilizer blend composition may be further defined by the combined weight percent of the metal salt of fatty acid and the hydrotalcite being present at a level of less than 30 percent by weight based on the total weight of the stabilizer blend composition, and more preferably being present at a level of less than 27 percent by weight based on the total weight of the stabilizer blend composition, and most preferably being present at a level of from between 18 and 22 percent by weight based on the total weight of the stabilizer blend composition. Additionally, applicant has found that if the total weight percent of the metal salt of a fatty acid is present at a level of 17 percent by weight or greater (for example, from 20 to 60 percent by weight), then the compacted particles made from the stabilizer blend composition exhibit undesirable levels of dust unless the stepwise method of the present invention is employed.

The blend composition defined above, is preferably formed into a compacted particle, which is formed by first blending the above ingredients of the blend composition to form the desired blend composition, and then compacting under pressure preferably by utilizing a roll compactor, and then pelletizing the material into the desired compacted particles, which is preferable in the form of pellets. Preferably the pellets have a substantially circular cross-section, which has a diameter of preferably between $\frac{1}{16}$ inch and $\frac{1}{4}$ inch, more preferably between 0.1 and 0.2 inches and most preferably between 0.11 and 0.15 inches.

The compacted particles are useful as additives for stabilizing polymeric compositions. Suitable thermoplastic resins for the polymeric compositions include any of the polymers known in the art, such as polyesters, polyurethanes, polyalkylene terephthalates, polysulfones, polyimides, polyphenylene ethers, styrenic polymers, polycarbonates, acrylic polymers, polyamides, polyacetals, halide containing polymers and polyolefin homopolymers and copolymers. Mixtures of different polymers, such as polyphenylene ether/styrenic resin blends, polyvinylchloride/ABS or other impact modified polymers, such as methacrylonitrile and alphamethylstyrene containing ABS, and polyester/ABS or polycarbonate/ABS and polyester plus some other impact modifier may also be used. Such polymers are available commercially or may be made by means well known in the art. However, the organic phosphite particulates of the invention are particularly useful in thermoplastic polymers, such as polyolefins, polycarbonates, polyesters, polyphenylene ethers and styrenic polymers, due to the extreme temperatures at which thermoplastic polymers are often processed and/or used.

Polymers of monoolefins and diolefins, for example polypropylene, polyisobutylene, polybutene-1, polymethylpentene-1, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE) and linear low density polyethylene (LLDPE) may be used. Mixtures of these polymers, for example, mixtures of polypropylene with polyisobutylene, polypropylene with polyethylene (for example PP/HDPE, PP/LDPE) and mixtures of different types of polyethylene (for example LDPE/HDPE), may also be used. Also useful are copolymers of monoolefins and diolefines with each other or with other vinyl monomers, such as, for example, ethylene/propylene, LLDPE and its mixtures with LDPE, propylene/butene-1, ethylene/hexene, ethylene/ethylpentene, ethylene/heptene, ethylene/octene, propylene/isobutylene, ethylene/butane-1, propylene/butadiene, isobutylene/isoprene, ethylene/alkyl acrylates, ethylene/alkyl methacrylates, ethylene/vinyl acetate (EVA) or ethylene/acrylic acid copolymers (EAA) and their salts (ionomers) and terpolymers of ethylene with propylene and a diene, such as hexadiene, dicyclopenltadiene or ethylidene-norbornene; as well as mixtures of such copolymers and their mixtures with polymers mentioned above, for example polypropylene/ethylene-propylene-copolymers, LDPE/EVA, LDPE/EAA, LLDPE/EVA and LLDPE/EAA.

Thermoplastic polymers may also include styrenic polymers, such as polystyrene, poly-(p-methylstyrene), poly (α-methylstyrene), copolymers of styrene or α-methylstyrene with dienes or acrylic derivatives, such as, for example, styrene/butadiene, styrene/acrylonitrile, styrene/alkyl methacrylate, styrene/maleicanhydride, styrene/butadiene/ethylacrylate/styrene/acrylonitrile/methylacrylate; mixtures of high impact strength from styrene copolymers and another polymers, such as, for example, from a polyacrylate, a diene polymer or an ethylene/propylene/diene terpolymer; and block copolymers of styrene, such as, for example, styrene/butadiene/styrene, styrene/isoprene/styrene, styrene/ethylene/butylene/styrene or styrene/ethylene/propylene styrene. Styrenic polymers may additionally or alternatively include graft copolymers of styrene or alpha-methylstyrene such as, for example, styrene on polybutadiene, styrene on polybutadiene-styrene or polybutadiene-acrylonitrile; styrene and acrylonitrile (or methacrylonitrile) on polybutadiene and copolymers thereof; styrene and maleic anhydride or maleimide on polybutadiene; styrene, acrylonitrile and maleic anhydride or malemide on polybutadiene; styrene, acrylonitrile and methyl methacrylate on polybutadiene, styrene and alkyl acrylates or methacrylates on polybutadiene, styrene and acrylonitrile on ethylene/propylene/diene terpolymers, styrene and acrylonitrile on polyacrylates or polymethacrylates, styrene and acrylonitrile on acrylate/butadiene copolymers, as well as mixtures of with the styrenic copolymers indicated above.

Nitrile polymers are also useful in the polymer composition of the invention. These include homopolymers and copolymers of acrylonitrile and its analogs, such as polymethacrylonitrile, polyacrylcnitrile, acrylonitrile/butadiene polymers, acrylonitrile/alkyl acrylate polymers, acrylonitrile/alkyl methacrylate/butadiene polymers, and various ABS compositions as referred to above in regard to styrenics.

Polymers based on acrylic acids, such as acrylic acid, methacrylic acid, methyl methacrylic acid and ethacrylic acid and esters thereof may also be used. Such polymers include polymethylmethacrylate, and ABS-type graft copolymers wherein all or part of the acrylonitrile-type monomer has been replaced by an acrylic acid ester or an acrylic acid amide. Polymers including other acrylic-type monomers, such as acrolein, methacrolein, acrylamide and methacrylamide may also be used.

Halogen-containing polymers may also be useful. These include resins such as polychloroprene, epichlorohydrin homo-and copolymers, polyvinyl chloride, polyvinyl bromide, polyvinyl fluoride, polyvinylidene chloride, chlorinated polyethylene, chlorinated polypropylene, florinated polyvinylidene, brominated polyethylene, chlorinated rubber, vinyl chloride-vinylacetate copolymers, vinyl chloride-ethylene copolymer, vinyl chloride-propylene copolymer, vinyl chloride-styrene copolymers, vinyl chloride-isobutylene copolymer, vinyl chloride-vinylidene chloride copolymer, vinyl chloride-styrene-maleic anhydride tercopolymer, vinyl chloride-styrene-acrylonitrile copolymer, vinyl chloride-butadiene copolymer, vinyl chloride-isoprene copolymer, vinyl chloride-chlorinated propylene copolymer, vinyl chloride-vinylidene chloride-vinyl acetate tercopolymer, vinyl chloride-acrylic acid ester copolymers, vinyl chloride-maleic acid ester copolymers, vinyl chloride-methacrylic acid ester copolymers, vinyl chloride-acrylonitrile copolymer and internally platicized polyvinyl chloride.

Other useful thermoplastic polymers include homopolymers and copolymers of cyclic ethers, such as polyalkylene glycols, polyethylene oxide, polypropylene oxide or copolymers thereof with bis-glycidyl ethers; polyacetals, such as polyoxymethylene and those polyoxymethlene which contain ethylene oxide as a comonomer; polyacetals modified with thermoplastic polyurethanes, acrylates or methacrylonitrile containing ABS; polyphenylene oxides and sulfides, and mixtures of polyphenylene oxides with polystyrene or polyamides; polycarbonates and polyester-carbonates; polysufones, polyethersulfones and polyetherketones; and polyesters which are derived from dicarboxylic acids and diols and/or from hydroxycarboxylic acids or the corresponding lactones, such as polyethylene terephthalate, polybutylene terephthalate, poly-1, 4-dimethylol-cyclohexane terephthalate, poly-2 (2, 2-4(4-hydroxyphenyl)-propane) terephthalate and polyhydroxybenzoates as well as block-copolyetheresters derived from polyethers having hydroxyl end groups.

Polyamides and copolyamides which are derived from diamines and dicarboxylic acids and/or from aminocarboxylic acids or the corresponding lactams, such as polyamide, 4, polyamide 6, polyamide 6/6, 6/10, 6/9, 6/12 and 4/6, polyamide 11, polyamide 12, aromatic polyamides obtained by condensation of m-xylene, diamine and adipic acid; polyamides prepared from hexamethylene diamine and isophthalic or/and terephthalic acid and optionally an elastomer as modifier, for example poly-2,4,4-trimethylhexamethylene terephthalamide or poly-m-phenylene isophthalamide may be useful. Further copolymers of the aforementioned polyamides with polyolefins, olefin copolymers, ionomers or chemically bonded or grafted elastomers; or with polyethers, such as for instance, with polyethylene glycol, polypropylene glycol or polytetramethylene glycols and polyamides or copolyamides modified with EPDM or ABS may be used.

Polyolefin, polyalkylene terephthalate, polyphenylene ether and styrenic resins, and mixtures thereof are more preferred, with polyethylene, polypropylene, polyethylene terephthalate, polyphenylene ether homopolymers and copolymers, polystyrene, high impact polystyrene, polycarbonates and ABS-type graft copolymers and mixtures thereof being particularly preferred.

Olefin polymers may be produced by polymerization of olefins in the presence of Ziegler-Natta catalysts optionally on supports such as but not limited to Mg $Cl_2$, chromium salts and complexes thereof, optionally supported on Silica or other materials. They may also be produced utilizing catalysts based on cyclapentadiene complexes of metals typically complexes of Ti and Zr.

The polyolefins may have amounts of residual catalysts present such as titanium trichloride supported on magnesium chloride carrier.

The stabilizer blend composition, and compacted particles made therefrom, preferably contain less than 5 percent by weight of other materials, specifically other organic materials, such as polymeric materials and waxes. Preferably the compositions are substantially free of other additives, containing for example less than 1 percent by weight of other materials.

Figure 1:
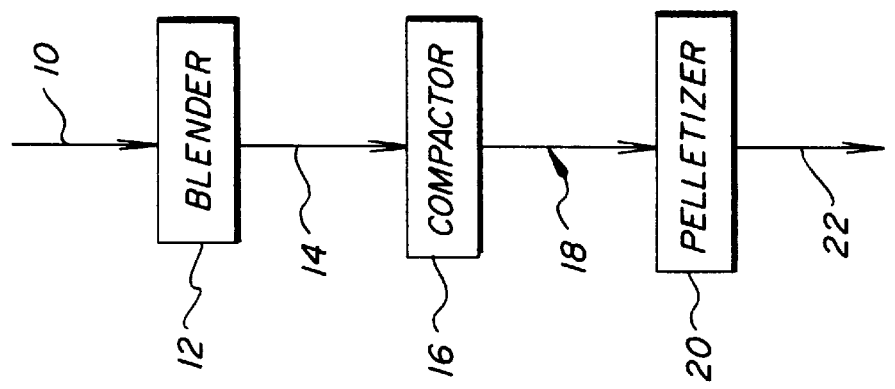
FIG. 1 is a schematic view of the method of the present invention.

The present method is illustrated in FIG. 1 wherein the initial ingredients (10) are transported by air forced flow or by mechanical conveyance such as by a screw feeder to a blender (12) wherein the ingredients are admixed (blended) at atmospheric conditions via a ribbon blender or other suitable blending device for mixing powder-like substances. The blended ingredients (14) then exit the blender and are transported by gravity, air forced feeding, or by suitable mechanical conveyance to a compactor (16). The compactor (16) compresses and compacts the powder into precompacted objects (densified compact) (18), in the form of briquette, logs or sheets which has a density of at least 20% greater than that of the density of the powder (14). The objects (18) are then conveyed by gravity, air forced flow or mechanical means to a pelletizer (20) for further densification into particles (22). The particles (22) have a density of at least 10 greater than the density of the precompacted objects (18). The increased density of the particles preferably pellets obtained by the present step-wise method, preferably pellets, allows for reduced dust and allows for higher combined loadings of metal salt of fatty acid and hydrotalcite than are achievable by single step compaction.

Figure 2:
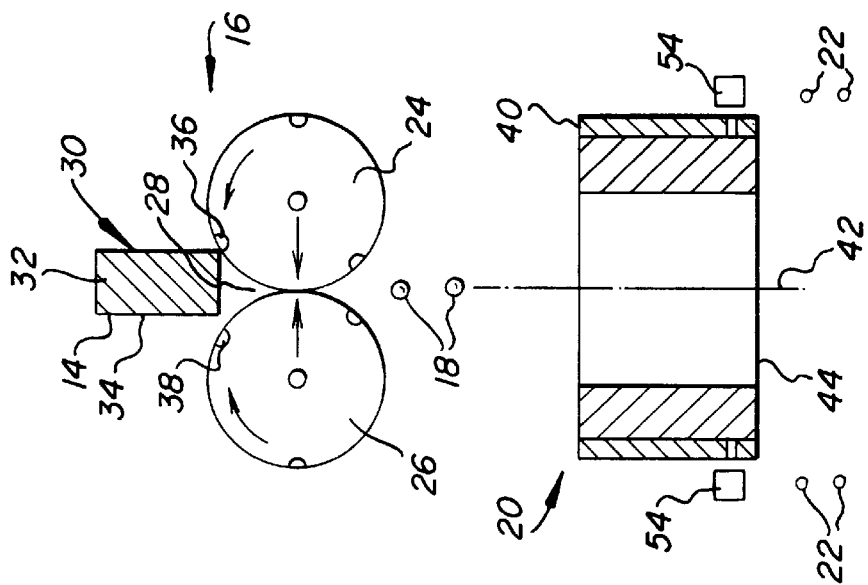
FIG. 2 is a transverse partially cross sectional view of the compactor and the pelletizer.

FIG. 2 illustrates a compactor (16) which utilizes a pair of compaction rollers (24), (26) which are forced together hydraulically in a horizontal direction, and which form a pinch point (28). A screw conveyer (30) transports the blend of ingredients, (14) via a screw (32) in a tube (34). Blended ingredient (14) accumulate above pinch point (28) and are compressed by counter rotation (roller 26 clockwise and roller 24 counter clockwise) to cause matching indentions (36), (38) on opposing rollers (24), (26) to forcibly compress the blended ingredients into precompacted objects. The matching indentions may be in the form of recessed pits or transverse grooves or indentions may be avoided entirely by adjusting the hydrolyic pressure between the rolls to permit a thin sheet of precompacted material to be formed. The precompacted material (objects) (18) may then be transported to a pelletizer (20) which is preferably in the form of an annular vertical wall (to be) (40) which rotates about its central vertical axis (42). A bottom wall (floor) (44) allows for the accumulation of objects (18) in the pelletizer (20). Forcible rotation (by motor or otherwise) of wall (44) above the axis (42) causes objects (18) to accumulate in a pair of pinch areas (46), (48) adjacent vertical cylinders (50), (52). The horizontally spaced apart vertical cylinders (50), (52) are located inside the annular wall (40) and are adjacent thereto to form the pinch areas (46), (48) and to force (under shear) material from the objects (18) into holes (orifices) (54) extending radially outwardly through the wall (44) to further densify the material to form particles via stationary cutting knives (54) which cut the compacted material into pellets (22).

EXAMPLES

Phos is a phosphate which is bis(2,4-di-t-butyl) pentaerythritol diphosphite.

HPIC is 1,3,5-tris(3,5-di-t-butyl-4-hydroxybenzyl) isocyanurate.

AST is a neutralizer which is a metal salt of a fatty acid, specifically calcium stearate.

HY is a hydrotalcite. The result column indicates the ability of the blend to form a durable compacted particle and correspondingly indicates the level of dust formation. A poor result means that the compacted particle did not form a durable compact and that powder resulted from the particle. Correspondingly, a good result indicated that the blend formed a durable compact, and the particle was essentially free from dust.

Examples A–H utilize a single step compactor method. Examples A, D, E and H illustrate formulations which may be utilized to achieve low dust particles via a single compaction step.

|   | PHOS | HPIC | CAST | HY | RESULT |
|---|------|------|------|-----|--------|
| A | 39.2 | 39.2 | 15.7 | 5.9 | Good |
| B | 36.15 | 36.15 | 21.3 | 6.4 | Poor |
| C | 40.0 | 26.7 | 25.6 | 7.7 | Poor |
| D | 41.5 | 41.5 | 10.0 | 7.0 | Good |
| E | 39.2 | 39.2 | 15.0 | 6.6 | Good |
| F | 38.3 | 38.3 | 17.0 | 6.4 | Poor |
| G | 36.9 | 36.9 | 20.0 | 6.2 | Poor |
| H | 49.0 | 32.7 | 15.0 | 3.3 | Good |

Examples A–H were added to blends consisting 10 of the respective amounts of the indicated ingredients, and were blended in a 16 quart twin-shell blender with intensifier bar and then compacted on a vectorfreund model TF-156 roll compactor.

The two step method of the present invention permits the utilization of high levels of metal salt of fatty acid (for example from 17 to 60 percent by weight, preferably from 20 to 50 percent by weight based on the total weight of the composition (particle)) to yield low dust particles.

What is claimed is:

1. An additive dust free blend consisting essentially of compacted particles having a substantially circular cross-section and a diameter from about 1/16 to about 1/4 inch and consisting essentially of:
   (a) a pentaerythritol phosphite present at a level of from 10 to 90 percent by weight based on the total weight of the particles;
   (b) a hindered phenolic isocyanurate present at a level of from 10 to 90 percent by weight based on the total weight of the particles;
   (c) a metal salt of a fatty acid present at a level of from 2 to 60 percent by weight based on the total weight of the particles;
   (d) a hydrotalcite present at a level of from 1 to 10 percent by weight based on the total weight of the particles; and
   (e) less than one percent by weight additional materials.

2. A blend of compacted particles of claim 1 wherein said particles consists essentially of said phosphite, said hindered phenolic isocyanurate, said metal salt of a fatty acid, and said hydrotalcite.

3. A blend of compacted particles of claim 1 wherein said particles consists of said phosphite, said hindered phenolic isocyanurate, said metal salt of a fatty acid, and said hydrotalcite.

4. A blend of compacted particles of claim 1 wherein said phosphite is bis(2,4-di-t-butyl) pentaerythritol diphosphite.

5. A blend of compacted particles of claim 1 wherein said hindered phenolic isocyanurate is 1,3,5-tris(3,5-di-t-butyl-4-hydroxybenzyl) isocyanurate.

6. A blend of compacted particles of claim 1 wherein said phosphite is present at a level of from 30 to 60 percent based on the total weight of the composition, and said hindered phenolic isocyanurate is present at a level of from 20 to 50 percent by weight based on the total weight of the composition.

7. A blend of compacted particles of claim 1 wherein said metal salt of a fatty acid is present at a level of from 10 to 16 percent by weight based on the total weight of the composition, and said hydrotalcite is present at a level of from 3 to 8 percent based on the total weight of the composition.

8. A method for making a dust free compacted particle, comprising the steps of
   (a) blending a pentaerythritol diphosphite, a hindered phenolic isocyanurate, a metal salt of a fatty acid and a hydrotalcite to form a stabilizer blend composition, comprising from 10 to 90 percent by weight of said phosphite, and from 10 to 90 percent by weight of said hindered phenolic isocyanurate, and from 2 to 60 percent by weight of said metal salt of a fatty acid, and from 1 to 10 percent by weight of said hydrotalcite; and
   (b) compacting said composition to form a densified compact,
   (c) pelletizing the densified compact under pressure into particles.

9. The method of claim 8 wherein said metal salt of a fatty acid is calcium stearate.

10. The method of claim 8, wherein said method further comprising exposing said compact to shear, and forcing said compact material through an orifice.

11. The particle of claim 1, wherein said metal salt of a fatty acid is present at a level of from 20 to 60 percent by weight based on the total weight of the particle.

* * * * *